Sept. 27, 1966 J. P. TAILOR 3,275,063
APPARATUS AND METHOD FOR GAS CONTACT SPRAY DRYING
Original Filed Sept. 10, 1959 6 Sheets-Sheet 1

INVENTOR
JOHN P. TAILOR

BY Richard G. Wynne &
John A. Finelau
ATTORNEYS

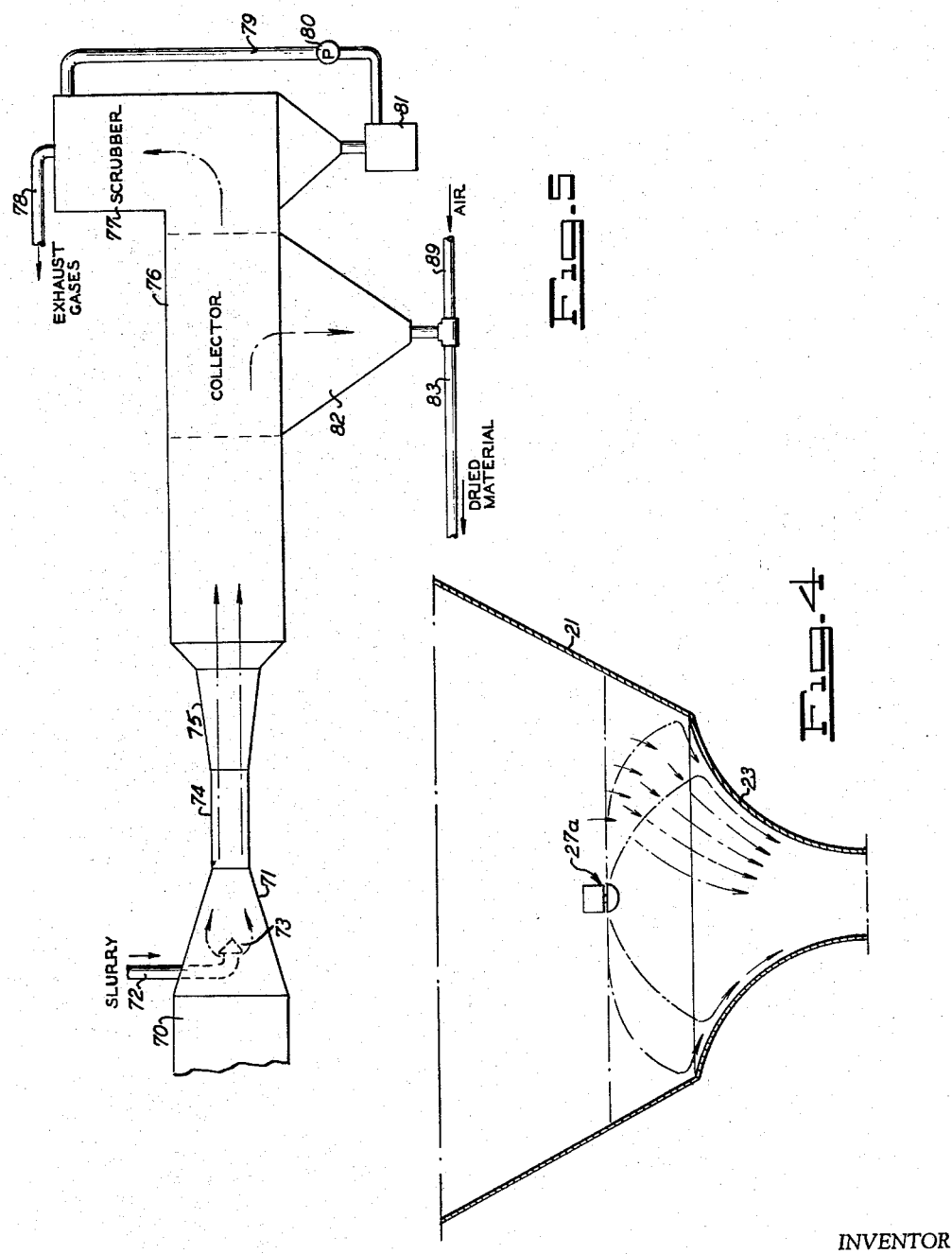

Sept. 27, 1966 J. P. TAILOR 3,275,063
APPARATUS AND METHOD FOR GAS CONTACT SPRAY DRYING
Original Filed Sept. 10, 1959 6 Sheets-Sheet 3

INVENTOR

JOHN P. TAILOR

BY Richard G. Wynne &
John A. Finken ATTORNEYS

Sept. 27, 1966  J. P. TAILOR  3,275,063
APPARATUS AND METHOD FOR GAS CONTACT SPRAY DRYING
Original Filed Sept. 10, 1959  6 Sheets-Sheet 4

INVENTOR
JOHN P. TAILOR
BY Richard G. Wynne &
John A. Finken.
ATTORNEYS

INVENTOR
JOHN P. TAILOR

United States Patent Office 3,275,063
Patented Sept. 27, 1966

3,275,063
APPARATUS AND METHOD FOR GAS
CONTACT SPRAY DRYING
John P. Tailor, Box 597, Davenport, Iowa 52805
Continuation of application Ser. No. 347,656, Feb. 25, 1964, which is a continuation of application Ser. No. 839,109, Sept. 10, 1959. This application Dec. 14, 1965, Ser. No. 518,515
4 Claims. (Cl. 159—4)

This application is a continuation of application Serial No. 347,656, filed February 25, 1964, now abandoned, which is a continuation of application Serial No. 839,109, filed September 10, 1959, now abandoned, which in turn is a continuation-in-part of application Serial No. 764,688, filed October 1, 1958, now abandoned.

This invention relates to methods and apparatus for contacting particulate solids or liquids with an accelerating gas stream to effect heat transfer, drying or other interaction between gases and solids or liquids.

It is among the objects of the invention to provide methods and apparatus for spray drying and flash drying of materials.

Other objects are to provide novel processes useful in the manufacture of Portland cement, soda ash, lime and for the drying of chemicals, coal, sand, and food and agricultural products.

The method of the present invention involves forcing a gas at high velocity through a zone of diminishing cross-section whereby the gas is accelerated in the zone, and injecting solid or liquid into the accelerating gas stream generally transversely of the direction of gas flow whereby the material is entrained in the gas stream in streamline flow.

The apparatus of the invention generally includes a conduit of diminishing cross-section, a throat communicating with the smaller end of the conduit, means for forcing gas at high velocity sequentially through the conduit and the throat, and means for injecting solid or liquid into the conduit in a direction generally transverse of the axis thereof. The injection means may be a nozzle for spraying liquid into the conduit in a direction transversely of the axis or it may be a distributor for injecting solids in such direction.

The apparatus as described herein including the conduit of diminishing cross-section and the throat communicating therewith, is termed a "flow nozzle." The means for injecting liquid material is termed a "feed nozzle" and means for injecting solids is termed a "distributor." Spray drying, as used herein, refers to the drying or concentration of liquid solutions or slurries, while flash drying refers to the removal of moisture from wet solids.

Reference is made to the accompanying drawings, in which:

FIG. 4 is a cross-section of a flow nozzle of the invention showing a spray feed nozzle and showing schematically the paths of the material injected therein.

FIG. 5 is a schematic representation of a dryer utilizing the principles of the invention.

Figure 1:
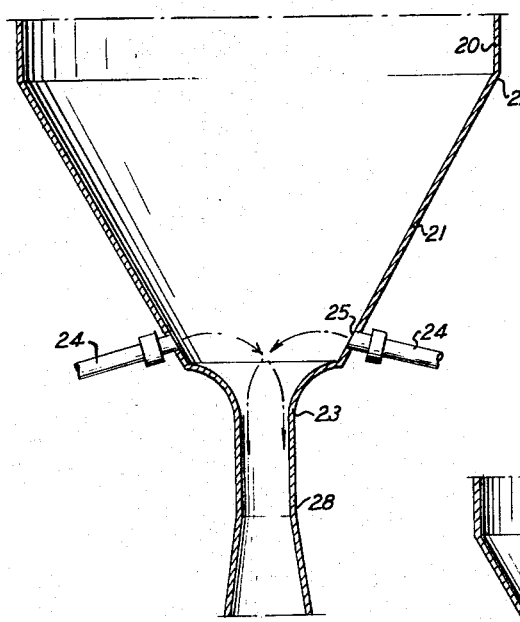
FIG. 1 is a cross-sectional view of a flow nozzle and accompanying feed nozzle structure employed in my invention.
Figure 2:
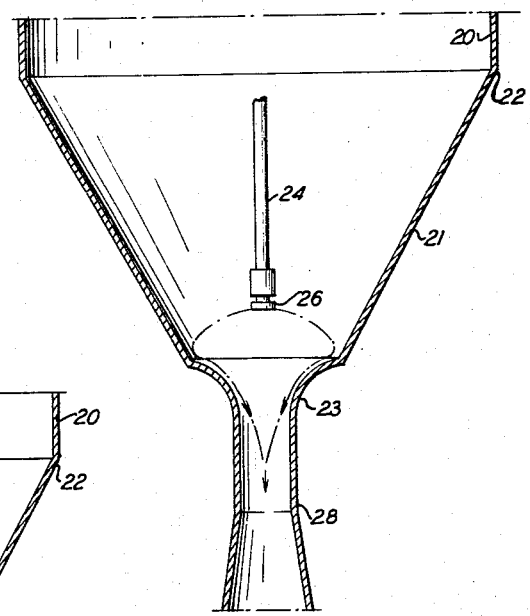
FIG. 2 is a cross-section of another embodiment of the flow nozzle section of the invention showing a different feed nozzle structure.
Figure 3:
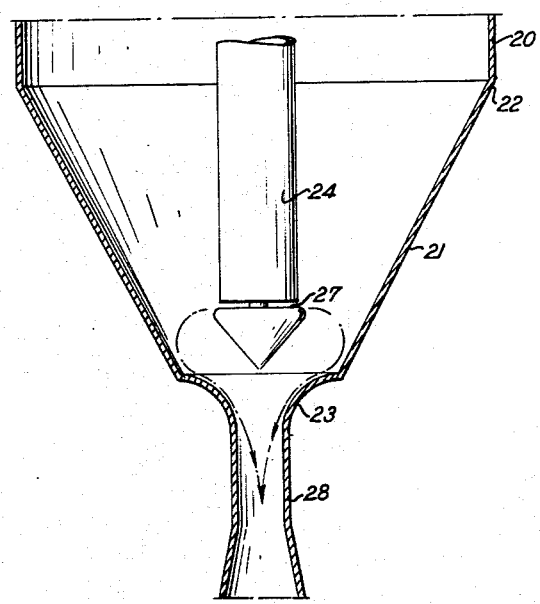
FIG. 3 is a cross-section of a further embodiment of the flow nozzle of the invention showing another modification of the feed nozzle structure.
Figure 10:
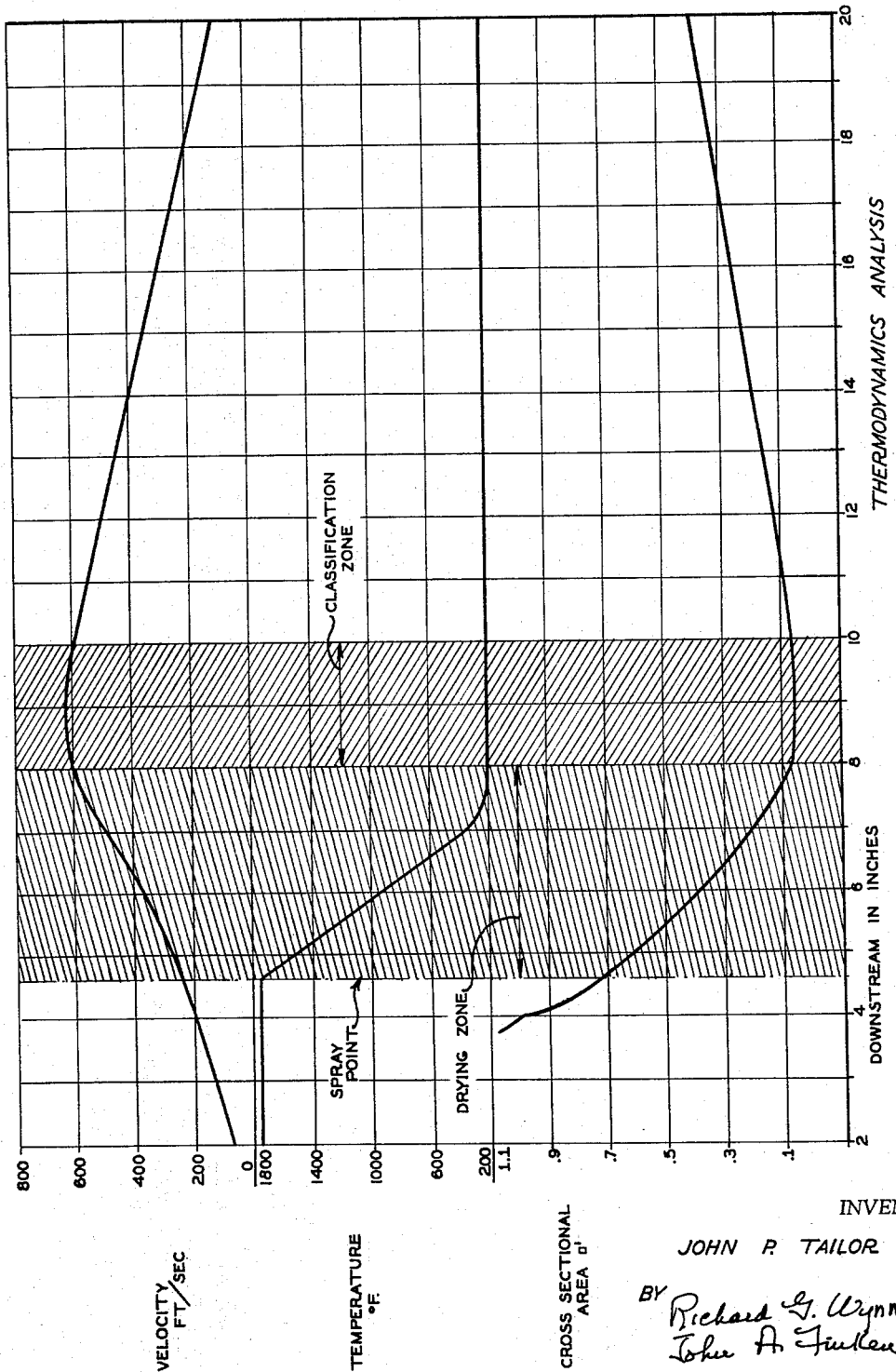
FIG. 10 is a graphic representation showing the relationship of gas velocity, temperature, and cross-sectional area of a flow nozzle section of the invention to positions stationed axially along the flow nozzle.
Figure 11:
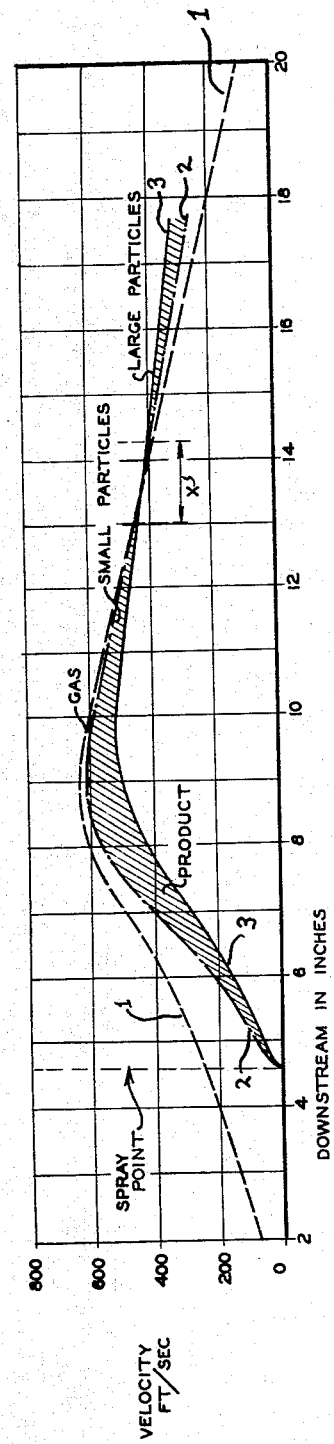
FIG. 11 is a representation similar to FIG. 10 additionally showing the velocity of solids.

In FIGS. 10 and 11 the abscissae indicate positions stationed along the flow nozzles shown in FIGS. 1–3. Thus, the position of the large end 22 of the converging section in FIGS. 1–3 is indicated by the abscissa 2. The spray point corresponding to the position in FIGS. 1–3 where the material contacts the accelerating gas is at about 4.5 inches. The narrowest section of the throat indicated at 23 in FIGS. 1–3 is 8 inches downstream as indicated by abscissa 8 on FIGS. 10 and 11.

Referring to FIGS. 1–3, gas at high velocity is supplied to conduit 20, moving toward the converging section 21, having its larger end 22 communicating therewith. The converging section 21 from its larger end 22 to the throat 23, being of decreasing cross-section, accelerates the gas flow therethrough. Solids or liquids are fed to nozzles located in the converging zone 21 of the flow nozzle and upstream of the throat 23. In FIG. 1, a plurality of nozzles 24 are uniformly spaced about the periphery of the flow nozzle and inject the material inwardly past the center of the flow nozzle toward the converging walls thereof. Nozzles 26 and 27 in FIGS. 2 and 3, respectively, inject the material outwardly from the center toward the walls thereof. The material, either solid or liquid, is thus injected into the accelerating gas in the flow nozzle in a direction generally transversely or laterally of the direction of the gas flow. The throat 23 of the flow nozzle is in communication with a diffusing conduit 28 which straightens the flow of gas and particles. The conduit 28 may be of uniform cross-section but is preferably of increasing cross-section to enable recovery of the pressure of the gas after passing through the throat 23 and accordingly reduce the power requirements for pumping the gas.

FIG. 4 illustrates diagrammatically the action of the accelerating gas stream on the material injected. The nozzle 27a feeds a thin, flat saucer-like sheet of liquid in the converging zone. The plane of the spray is perpendicular to the axis of the flow nozzle. As the accelerating gas stream contacts the sheet of liquid, it first bends the sheet and then shears it into discrete droplets which are swept along by the gas stream as indicated by the arrows of FIG. 4.

The material injected is a solid or liquid. Solids, of course, are particulate or discrete. Liquids may be injected by an atomizing spray nozzle, in which case the liquid is particulate when it contacts the accelerating gas, or as a sheet of liquid as in FIG. 4 wherein the gas stream breaks up the sheet into discrete droplets. The material injected may accordingly be broadly defined as "discrete part-forming flowable material" which is intended to cover discrete solids and liquid droplets per se and streams or sheets of liquid which can be sheared into discrete droplets.

The precise shape of the converging section of the flow nozzle does not appear to be critical but it must converge sharply enough so that the gas accelerates throughout the converging zone. In other words, the velocity of the gas must increase progressively throughout the converging zone. The velocity for a typical installation is plotted in FIG. 10, and, it is pointed out that the velocity increases faster than linearly in spite of the fact that the temperature of the gas is dropping, which thereby decreases the volume of the gas as it passes through the converging section.

The nozzles must direct the material transversely of the gas flow toward the walls of the converging zone. No deposits of material are built up on the walls 21, on the walls of the throat section 23 nor on the walls of the diffuser 28. The converging gas stream sweeps the particles along as generally indicated by the arrows in FIGS. 1–4. In the diffusing conduit 28, as the gas flow straightens, it has been found that particles of greater mass are concentrated along the center axis of the conduit while the fines concentrate at the periphery thereof. This affords a convenient means to classify particles according to mass by separately collecting the particles adjacent the center and adjacent the periphery of the conduit, respectively.

If the material is injected axially down the throat, or if it is injected transversely of the gas flow in the throat 23, the objects and advantages of the invention are not accomplished. Such practices result in highly turbulent conditions, poor heat transfer, and in the case of drying wet solids, plastering or adherence of wet material to the walls of the apparatus. Accordingly, the material must initially contact the gas stream at a point where the gas stream is accelerating and in a direction generally transversely of the direction of gas flow whereby the material has an elongated path and remains in the converging zone long enough to accomplish the desired contact with the gas.

The flow through the flow nozzle, throat and remaining conduits is stream-like and non-turbulent. Turbulence is to be avoided in the practice of the invention as it results in lower capacity of the apparatus, non-uniform drying or heat transfer and sticking of material on the walls of the apparatus.

A wide range of flow conditions is operable in the practice of the invention. Generally, liquid material fed to the nozzle is under relatively low pressure—on the order of 25–100 p.s.i. at the nozzle. Solid materials are fed in gaseous suspension at relatively low pressure or may be spun off a rotating distributor plate. In addition to the nozzle shown in FIGS. 1–4, a spinner may be used for feeding liquid materials. In a typical installation as outlined in FIG. 10 the large end 22 in FIGS. 1–3 of the converging section is 20 inches inside diameter, and the throat 23 in FIGS. 1–3 is 3½ inches inside diameter. The total length of the converging section is 8 inches. Air at 1750° F. is delivered at a velocity of 50 feet/second. The velocity at the throat 23 in FIGS. 1–3 reaches 600 feet/second while the temperature drops from 1750° F. to 200° F. The example depicted in FIG. 10 feeds water only to the nozzle. For particular operations, the gas velocity at the inlet 22 in FIGS. 1–3 to the converging section may vary from 25–100 feet/second to 250–1000 feet/second at the throat. The pressure drop across the apparatus may range from 20 to 140 inches of water gauge for liquid materials and from 10 to 300 inches of water gauge for solid materials.

As will be apparent from FIG. 10, substantially all the heat transfer occurs in the converging section.

It is apparent that very high rates of heat transfer are effected in the converging zone of the nozzle. It is therefore possible to evaporate tremendous quantities of water, for example, in a very small volume of space. Dryers built in accordance with the present invention have effected heat absorption rates of 3 million to 30 million B.t.u./hour/cubic foot.

The flow nozzle and accompanying conduits and nozzles are manufactured from suitable metals; for applications involving high temperatures, refractory coated stainless steel is preferred.

Reference is now made to specific embodiments of the invention as illustrated in the drawings.

FIGURE 5 illustrates an application of the invention useful for spray-drying of solutions and slurries.

Hot gases at high velocity, emanating from a burner and blower arrangement, now shown, are delivered to conduit 70. The material to be dried is delivered through pipe 72 to feed nozzle 73 where it is injected into the accelerating gas stream in the direction generally transversely of the gas flow. The converging section of the flow nozzle is indicated at 71 and the throat is indicated at 74. All the heat exchange is accomplished by the time the injected material reaches the throat 74 and the dried material is carried into the diffuser section 75 and thence into the collector 76. The dried material empties into hopper 82 and may be removed through pipe 83 by air feed to pipe 89. The gases after leaving the collector are scrubbed in the scrubber 77 to remove suspended fines and the gases are exhausted through conduit 78. The washing liquid is delivered to the top of the scrubber through pipe 79 by pump 80 and the recovered fines are collected in sump 81. The supernatant washing liquid is recycled to the scrubber in a manner well known in the art.

Examples of material dried in the apparatus shown in FIG. 5 include slurries of clay and limestone which are dried to form the material which is calcined to form Portland cement clinker, and slurries of silica gel.

Figure 6:
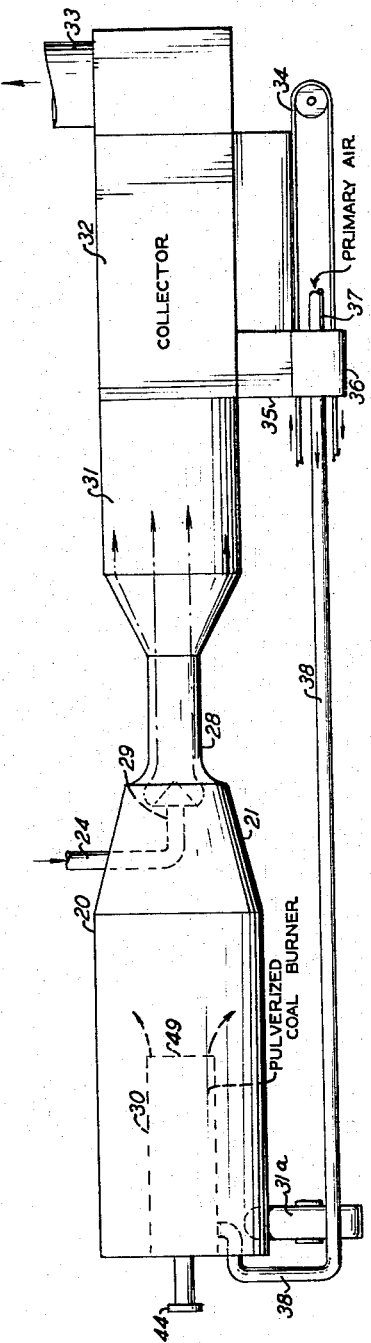
FIG. 6 is a schematic representation of a coal dryer utilizing the principles of the invention.

FIG. 6 illustrates a powdered coal dryer utilizing the principles of the invention. Wet ground coal suspended in a stream of air is delivered through conduit 24 to nozzle 29 where it is directed outwardly toward the converging walls of flow nozzle 21. Hot gas at high velocity is provided in section 20 by means of a burner 30 and a blower which delivers air to conduit 20. The coal is dried in the converging section 21 and passes through the diffusing conduit 28 where the fines are concentrated adjacent the periphery of the conduit and the heavier particles concentrated near the center. The gas and coal particles in suspension are passed through an enlarged conduit 31 where their velocity is reduced and through collector 32. The cooled, wet gases are exhausted through pipe 33 where they may be scrubbed with water if desired to remove suspended fines. The collector deposits the heavier particles collected from the center of conduit 31 on conveyor belt 34. At least a portion of the fines, collected from the periphery of conduit 31, are fed through chute 35 to a suspension zone 36 where they are picked up in suspension by a current of air admitted at 37 and delivered to the burner 30 via pipe 38. The coal dryer thus efficiently dries the coal, classifies it and a portion of the fines are burned to develop the heat necessary to dry the coal. In practice, it may be preferred to deliver the wet coal to the dryer by conveyor 34, remove only a portion of it for feeding to the dryer and leave the remainder on the conveyor. The portion passing through the dryer is collected in the bone-dry state and is deposited on top of the remainder of wet coal on the conveyor, thus yielding coal of satisfactory moisture content.

As an example of the operation of the coal dryer of FIG. 6 86.8 tons/hour of wet coal containing 18 percent water were dried in the apparatus of FIG. 6 to a moisture content of 5 percent water. The heat was supplied by burning 1.05 tons/hours of the dried fines (1 ton/hour bone-dry fines). The water evaporated amounted to 11.8 tons/hour. Heat requirements were 1170 B.t.u./pound of water evaporated. The temperature at the burner mouth 49 was 3000° F. The blower 31a supplied 16,000 s.c.f. air/minute (1230 pounds/minute), yielding a temperature of 1500° F. at the nozzle 29. The air was exhausted at 220° F.

Figure 8:
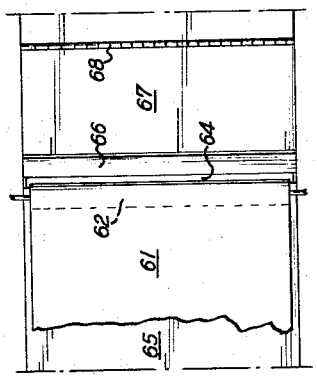
FIG. 8 is a top plan view of the structure shown in FIG. 7.
Figure 7:
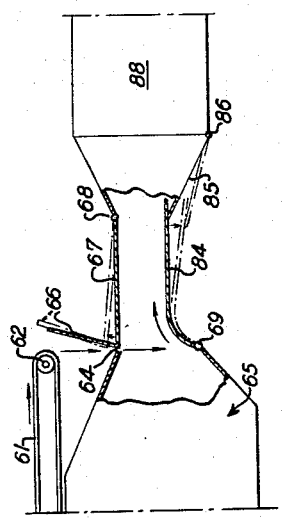
FIG. 7 is a view, partly in elevation and partly in cross-section, showing a further embodiment of a flow nozzle and solid material feeding means therefor.

FIGS. 7 and 8 illustrate an alternative form of horizontally disposed contact apparatus. The flow nozzle in this instance is not of symmetrical conical shape but instead comprises a trough. The gases to be contacted are fed through rectangular conduit 65 having converging top and bottom which terminates at a throat of limited cross-section defined by members 67 and 84. The bottom plate 84 is pivotally hinged to the bottom of conduit 65 at 69. The top plate 67 is pivotally hinged to the top of rectangular conduit 88 at 68. Plate 85 is likewise pivotally hinged to the bottom of conduit 88 at 86. It is apparent from FIG. 7 that the cross-section area of the throat section may be adjusted and varied by movement of the plates 67, 84 and 85.

The top plate 67 carries upstanding member 66 secured thereto. A slit 64 extending across the entire conduit assembly is utilized for admitting solid material to the flow nozzle. Such solid material may be uniformly admitted through the slit 64 by a conveyor belt 61 riding over a driving roller 62. Other forms of conveyors, including vibratory feeders may be utilized in place of the belt conveyors as well known in the art. The conveyor and slit 64 may be contained in a housing, not shown, which may be pressurized to avoid escape of materials or to preserve the atomsphere within the nozzle.

In operation, the apparatus of FIGS. 6 and 7 are used to dry wet solids such as coal, sand and the like, which are uniformly fed to the slit 64 by the conveyor. The material falling through the slit gravitates in a direction transverse of the gas stream and is accelerated by the accelerating gas stream and moved through the throat in streamline, non-turbulent flow. The dried material is collected down stream from the conduit 88 as heretofore described.

The flow nozzle of FIGS. 7 and 8, in addition to being adjustable in the throat size to enable close control of the operation, may be made in sizes having very large capacity. Thus, it is apparent that the trough can be any width to give the capacity required. As in the case of the conical nozzle, substantially all the heat transfer or drying takes place between the point of introduction of the solids and the throat.

Figure 9:
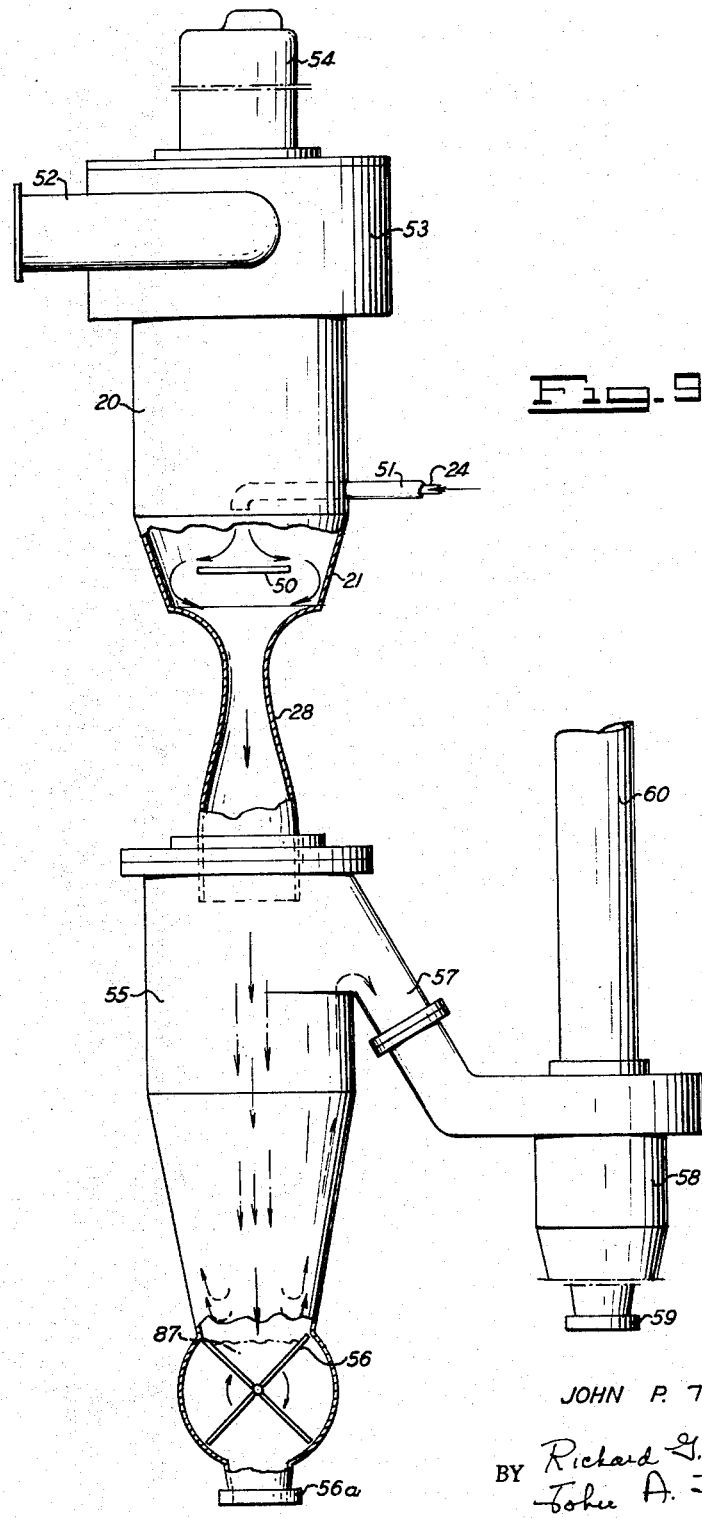
FIG. 9 is a view partly in elevation and partly in cross-section showing a vertical dryer utilizing the principles of the invention.

FIG. 9 shows a vertical dryer or contact apparatus. Air from a blower (not shown) is fed to casing 53 via conduit 52. The air passes downwardly through conduit 20 and through the flow nozzle 21, 28. A burner is indicated generally at 54 in communication with conduit 20. Conduit 28 feeds into a collector 55.

Material to be treated is fed through pipe 24 to a nozzle where it is directed outwardly toward the converging walls of the flow nozzle. In the embodiment shown for drying solids such as coal, etc., the wet solids are fed onto a rotating distributor plate 50. The feed pipe 24 is preferably contained within a water jacket 51 as shown. Dried or treated material is collected in collector 55 and periodically removed through rotating air lock 56 to 56a. The gas, containing fines, is removed from the collector 55 by conduit 57 to a second collector 58. Fines are removed at 59 and the gas is exhausted through 60. Collector 58 may be a cylone separator or other separator. The exhausted gases from 60 may be passed through a wet scrubber if desired.

The dried solids 87 collected in the quadrant of the air lock 56 serve to provide a cushion of air at the bottom of the collector 55. Thus, the relatively high velocity air moving downwardly in the collector "bounces" off the material in the air lock and passes upwardly. This decelerates the particles and prevents their breaking up or compacting in the air lock.

As an example of drying using the apparatus of FIG. 9, 4,200 pounds/hour of silica slurry (containing 8 percent silica, 2 percent salts and 90 percent water, prepared by the acid hydrolysis of sodium silicate) was fed to the nozzle 50 of the dryer of FIG. 8 at 40 p.s.i.g. pressure. Air was delivered to inlet 52 at the rate of 2,500 s.c.f./minute (192 pounds/minute) and 4,200 s.c.f./hour of natural gas were burned in burner 54. The temperature at the feed plate 50 was 1800° F. and the temperature of the exhaust gas in the collector 55 was 270° F. The yield was 520 pounds/hour of silica gel containing 30 percent water. The fuel cost included 1140 B.t.u./pound of water evaporated plus 42 horsepower for operating the blower and pump for feeding slurry to the nozzle.

Other applications of the apparatus of FIG. 9 include flour cooling and drying. Air at 130° F. is pumped into inlet 52 and flour at 94° F. and 14.6 percent moisture content is delivered to feed plate 50. The flour-air mixture, after passing through air lock 56, is then fed to a cooling section, not shown, where cooled and dehumidified air is admitted. The flour is collected, having a temperature of 50° F. and a moisture content of 12 percent. The exhaust air has a temparture of 46° F.

The operation of dryers of the invention may utilize recirculation of a portion of gases from the collection stage to the blower upstream of the flow nozzle. Thus, in FIG. 5, a portion of the gases from conduit 78 may be recycled to conduit 70; in FIG. 6, gases from 33 may be recycled to 20; and in FIG. 9, gases from pipe 60 may be recycled to the blower feeding the conduit 52. This is particularly important where heat-sensitive materials are used; the cool, moisture-laden exhaust gases quench the burner gases and thus lower the temperature of the gas delivered to the flow nozzle. This is important in coal drying, as the recycled gas is largely carbon dioxide and nitrogen, thus eliminating the explosion hazard which has been common in flash dryers for finely divided coal.

Another mode of operation involves quenching of the gases as they leave the flow nozzle and before the collector stage. This prevents decomposition of heat sensitive materials.

The following table illustrates the results of spray drying of a variety of aqueous solutions and slurries on an apparatus like that shown in FIG. 9 with a spray nozzle as shown in FIG. 4. The inlet temperature referred to was the temperature of the air at the point of injection of the liquid and the outlet temperature was measured at the collector.

| Material | Percent Solids in Feed | Inlet T., ° F. | Outlet T., ° F. | Particle Size, Microns |
| --- | --- | --- | --- | --- |
| Blood | 17 | 1,400 | 250 | 35 |
| Silica Gel | 9 | 1,800 | 270 | 61 |
| Alumina Gel | 21 | 1,800 | 300 | 44 |
| Sodium Bichromate | 70 | 1,800 | 290 | 50 |
| Sodium Carbonate | 26 | 1,800 | 270 | 26 |
| Skim Milk* | 47 | 1,400 | 140 | 90 |
| Molasses* | 75 | 1,200 | 130 | 50 |
| Polyvinyl Chloride* | 30 | 1,200 | 130 | 55 |

*Indicates cold air quench of product with 300 to 400% excess air.

Additionally, the method and apparatus has been found useful for the concentration of solutions, such as sodium carbonate from 26% to 32% by weight, phosphoric acid from 48% to 70% by weight.

Additional products flash dried include coal, wood pulp, soda ash and sand. The method and apparatus of the invention are also useful for calcining limestone, converting sodium bicarbonate to soda ash, removing water or crystallization from salts, rapid quenching of hot reaction gases, gas-solid reactions, as well as other heat-transfer contact processes.

FIG. 11 illustrates the velocity distribution curve of the gas and particles in an average spray dryer operation in accordance with this invention. As is apparent, the gas is always moving at a velocity greater than that of any of the particles until the region X, wherein the rapidly decelerating gas is overtaken by the solid particles which cannot slow down as quickly. In the flow nozzle shown, this occurs between 13 and 14 inches downstream in the nozzle or about 8 to 9 inches downstream from the point of injection. Curve 1 indicates the gas velocity; curve 2, the velocity of the small particles; and curve 3, the velocity of the large particles.

As has been pointed out, turbulent conditions do not occur in the flow nozzle of the invention. Turbulence has been previously thought to be essential for efficient contact and heat transfer in dryers. However, in a state of turbulence, it is impossible to have uniform velocities of the particles, which, accordingly, extends the average time to effect heat transfer. In the streamline flow conditions of the present invention, uniform particle velocities occur and it is accordingly possible to control the relative motion between gas and particles.

The feed nozzle for feeding the liquid or solid into the flow nozzle of the invention is preferably axially adjustable within the nozzle, in order that the injection for a given material may occur at the optimum point to give the desired particle size.

While the invention has been described in terms of certain embodiments and examples, such are to be considered illustrative rather than limiting.

I claim:

1. In the method of drying a wet solids-containing material at an initial low temperature by contacting the same with a hot drying gas at an initial high temperature to produce dry solids and wet gas having final temperatures intermediate said initial high and low temperatures, the improvement which comprises forcing said hot drying gas at an initial velocity of 25 to 100 feet per second in streamline flow through a zone narrowing in cross-section in the direction of gas flow to produce an accelerating gas stream and introducing said material into said zone in particulate form in a direction transverse of the flow of said accelerating gas stream, said zone narrowing in cross section to such an extent, as correlated to the relative flow rates of said gas and material and respective initial temperatures thereof, that said gas accelerates therein to a velocity of 250 to 1000 feet per second while decreasing in volume upon cooling from its initial temperature to its final temperature, whereby particles of said material are entrained and accelerated in streamline flow by said gas stream to dry the particles.

2. The method set forth in claim 1 wherein said material is a solids-containing solution which is thereby spray dried.

3. The method set forth in claim 1 wherein said material comprises wet particulate solids which are thereby dried.

4. Apparatus for drying a wet solids-containing material comprising a horizontal conduit having an inlet and an outlet, the walls of said conduit converging from said inlet to said outlet to provide a gas acceleration chamber, the upper wall of said acceleration chamber having a slit therein for delivering wet material thereto by gravity in a direction transverse of the longitudinal axis of the chamber, gas heating and blower means for providing a current of drying gas, duct means communicating with said inlet and said heating and blower means for conveying drying gas to said conduit, and collecting means communicating with said outlet for collecting dried material.

References Cited by the Examiner

UNITED STATES PATENTS

| | | | |
|---|---|---|---|
| 477,692 | 6/1892 | McConnell | 302—57 |
| 1,157,935 | 10/1915 | Gray | 159—4 |
| 1,428,526 | 9/1922 | Bradley. | |
| 1,454,979 | 5/1923 | Muhlfield et al. | |
| 1,594,065 | 7/1926 | MacLachlan | 159—4 |
| 1,722,175 | 7/1929 | Bowen | 159—4 |
| 1,971,566 | 8/1934 | Hutton | 87—16 |
| 2,077,819 | 4/1937 | Zizinia | 99—26 |
| 2,154,000 | 4/1939 | Zizinia | 159—4 |
| 2,343,027 | 2/1944 | Ramen | 159—48 |
| 2,357,648 | 9/1944 | Hall | 34—57 X |
| 2,460,546 | 2/1949 | Stephanoff | 159—4 |
| 2,471,035 | 5/1949 | Hurd. | |
| 2,531,343 | 11/1950 | Patterson | 159—4 |
| 2,576,264 | 11/1951 | Coulter et al. | 159—4 |
| 2,670,036 | 2/1954 | Spalding | 159—48 |
| 2,774,660 | 12/1956 | Cook et al. | |
| 2,887,390 | 5/1959 | Coulter et al. | 159—4 X |
| 2,921,383 | 1/1960 | Morris. | |

NORMAN YUDKOFF, *Primary Examiner.*

J. SOFER, *Assistant Examiner.*